United States Patent
Schmitz

(10) Patent No.: US 10,744,870 B2
(45) Date of Patent: Aug. 18, 2020

(54) OPERATING FLUID CONTAINER WITH STIFFENING ELEMENT, AND METHOD FOR PRODUCING AN OPERATING FLUID CONTAINER

(71) Applicant: KAUTEX TEXTRON GMBH & CO. KG, Bonn (DE)

(72) Inventor: Dieter Schmitz, Bonn (DE)

(73) Assignee: KAUTEX TEXTRON GMBH & CO. KG, Bonn (DE)

(*) Notice: Subject to any disclaimer, the term of this patent is extended or adjusted under 35 U.S.C. 154(b) by 0 days.

(21) Appl. No.: 16/086,915

(22) PCT Filed: Mar. 1, 2017

(86) PCT No.: PCT/EP2017/054710
§ 371 (c)(1),
(2) Date: Sep. 20, 2018

(87) PCT Pub. No.: WO2017/162412
PCT Pub. Date: Sep. 28, 2017

(65) Prior Publication Data
US 2019/0105982 A1    Apr. 11, 2019

(30) Foreign Application Priority Data
Mar. 21, 2016 (DE) .................. 10 2016 204 648

(51) Int. Cl.
*B60K 15/03* (2006.01)
*B29C 49/20* (2006.01)
(Continued)

(52) U.S. Cl.
CPC ........ *B60K 15/03177* (2013.01); *B29C 49/20* (2013.01); *B29C 2049/2013* (2013.01);
(Continued)

(58) Field of Classification Search
CPC ............ B60K 15/03177; B60K 15/077; B60K 2015/0344; B60K 15/03; B60K 15/073;
(Continued)

(56) References Cited

U.S. PATENT DOCUMENTS 3,739,882 A * 6/1973 Schwenk ................ B60R 19/18
188/268
7,427,000 B2 * 9/2008 Austerhoff ....... B60K 15/03006
220/4.14
(Continued)

FOREIGN PATENT DOCUMENTS

DE   102007024677   11/2008
DE   102008009829   8/2009
(Continued)

OTHER PUBLICATIONS

English translation of International Search Report dated Jun. 28, 2017, received in corresponding PCT Application No. PCT/EP2017/054710.

*Primary Examiner* — Shawn M Braden
(74) *Attorney, Agent, or Firm* — Grossman, Tucker, Perreault & Pfleger, PLLC

(57) ABSTRACT

Operating fluid container made of thermoplastic for a motor vehicle, with the following features: the operating fluid container has two openings in opposite container walls of the operating fluid container, and a stiffening element extending through both openings; and two stiffening element ends engage behind the container walls from the outside, such that the stiffening element counteracts a deformation caused by internal pressure of the operating fluid container, wherein the operating fluid container is characterized by the following features: a stabilizing element is arranged between at least one stiffening element end and a container wall; the stabilizing element has a through-opening through which the (Continued)

stiffening element extends; the stabilizing element has a first and a second thermoplastic; and the stabilizing element is welded to a container wall.

11 Claims, 2 Drawing Sheets

(51) Int. Cl.
B29K 23/00 (2006.01)
B29K 677/00 (2006.01)
B29L 31/00 (2006.01)
B60K 15/035 (2006.01)

(52) U.S. Cl.
CPC .... *B29K 2023/065* (2013.01); *B29K 2677/00* (2013.01); *B29L 2031/7172* (2013.01); *B60K 15/035* (2013.01); *B60K 2015/03032* (2013.01); *B60K 2015/0346* (2013.01); *B60K 2015/03493* (2013.01)

(58) Field of Classification Search
CPC .......... B60K 2015/03453; B65D 90/52; B65D 11/22; B65D 1/0223
USPC .............................. 220/4.13, 89.2, 651–653
See application file for complete search history.

(56) References Cited

U.S. PATENT DOCUMENTS

| 7,455,190 B2 * | 11/2008 | Potter .............. B60K 15/03177 220/4.12 |
| 8,919,599 B2 | 12/2014 | Menke |
| 2009/0206097 A1 | 8/2009 | Gebert et al. |
| 2012/0325822 A1 | 12/2012 | Pozgainer |
| 2014/0014663 A1 | 1/2014 | Eulitz et al. |
| 2015/0083719 A1 | 3/2015 | Hutzen et al. |

FOREIGN PATENT DOCUMENTS

| DE | 102010036683 | 2/2012 |
| DE | 102011015049 | 9/2012 |
| DE | 102012008394 | 10/2013 |
| EP | 2537696 | 12/2012 |

* cited by examiner

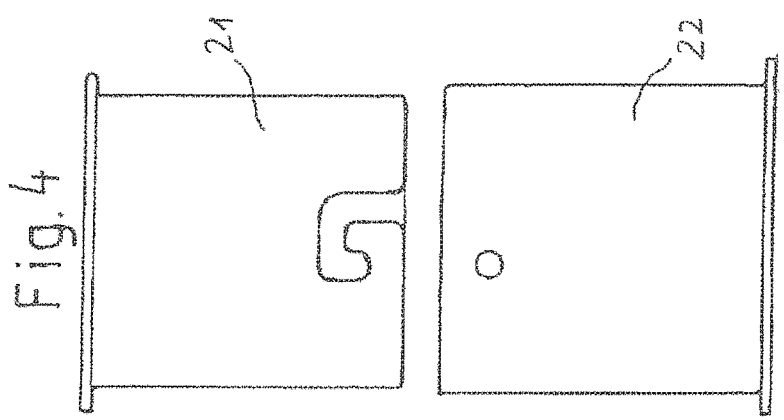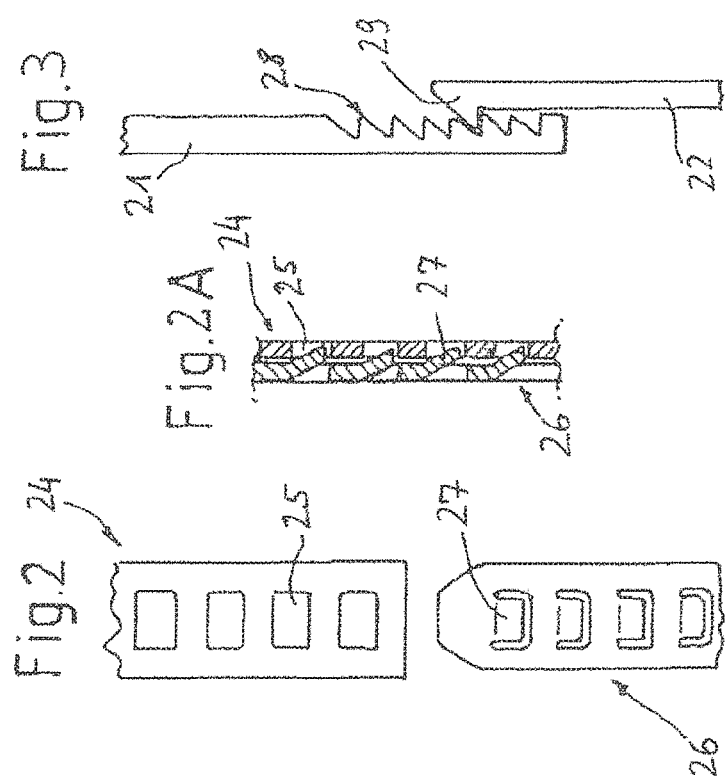

OPERATING FLUID CONTAINER WITH STIFFENING ELEMENT, AND METHOD FOR PRODUCING AN OPERATING FLUID CONTAINER

FIELD

The invention relates to an operating fluid container made of thermoplastic for a motor vehicle.

Furthermore, the present invention relates to a method for producing an operating fluid container made of thermoplastic for a motor vehicle.

BACKGROUND

Within the context of the invention, operating fluid containers made of thermoplastic are in particular, but not exclusively, fuel containers for motor vehicles, wiping water containers, oil containers, secondary fluid containers or additive containers for motor vehicles. Containers of the type mentioned at the beginning are frequently produced by extrusion blow molding, wherein in particular high density polyethylene (HDPE) is suitable for the production of extrusion-blow-molded containers.

In the case of motor vehicles having an internal combustion engine, when an operating fluid container, in particular the fuel container, is subjected to heat, the operating fluid, e.g. the fuel, is likewise heated, such that the vapor pressure of the operating fluid increases and the operating fluid container is subjected to a corresponding internal pressure, as a result of which the fuel container is subject to deformation.

For the ventilation of an operating fluid container in the form of a fuel container, said container is fluidically connected to an activated carbon filter for filtering out fuel vapors. The activated carbon filter is flushed by means of intake air during operation of the internal combustion engine, such that fuel vapors bound in the activated carbon can be fed to the internal combustion engine. The absorption capacity of the activated carbon filter can be limited on account of the flushing process using intake air.

In the case of hybrid motor vehicles, there is furthermore a further problem caused by the reduced operating time of the internal combustion engine. On account of the reduced operating time of the internal combustion engine, an activated carbon filter which is fluidically connected to the fuel container undergoes correspondingly less flushing, and therefore also less fuel vapor bound in the activated carbon can be flushed out. This in turn has the effect that activated carbon filters for hybrid motor vehicles have to have larger dimensions. Furthermore, through the ventilation of the fuel container via the activated carbon filter, more fuel is converted into the vapor phase, and therefore it appears to be advantageous to design the fuel container to be stiffer and/or more pressure-resistant.

It is known from the prior art to stiffen the fuel container using winding configurations and/or stiffening elements inside the fuel container. However, wound fuel containers are complex in their production and therefore costly. In addition, an effectively windable geometry limits the degree of configuration freedom in the design and therefore the utilizable volume.

In order to introduce a stiffening element into the operating fluid container, it is known from the prior art to use the "twin sheet blowmolding" method for producing the operating fluid container, in which either two sheet-like preforms are extruded from an extrusion head with two extrusion nozzles, or a tubular preform is separated into two sheet-like lobes. The sheet-like preforms are each molded in a blow mold half of a multi-part blow mold by means of differential pressure. Subsequently, by means of an intermediate frame of the blow mold, positioned between the two blow mold halves, a stiffening element is positioned between the molded container shells, which are still located in the cavities of the blow mold halves, of the operating fluid container and connected to at least one inner side of a container shell. Finally, the intermediate frame between the blow mold halves is removed, and, by the container shells being brought together, the stiffening element is connected to a further inner side of a container shell such that the stiffening element can counteract pressure-induced deformation.

Fuel containers, in particular for gasoline, are customarily manufactured from multi-layered, co-extruded plastics. At least one barrier layer for hydrocarbons is embedded in the wall of the fuel container. The operating fluid container produced by means of the "twin sheet blow molding" method therefore affords the advantage that the barrier layer is not damaged during the introduction of the stiffening element, and therefore no leakage of hydrocarbons is formed. However, compared with the blow molding of a tubular preform, the "twin sheet blow molding" method is time-consuming and costly.

SUMMARY

The problem on which the present invention is based is to provide an improved operating fluid container which has increased pressure stability, and the production of which is more rapid and more cost-effective.

The present invention is based on the object of providing a method for producing an operating fluid container made of thermoplastic, by means of which an operating fluid container having increased pressure stability is able to be produced rapidly and cost-effectively.

This object is achieved by a method with the features specified in claim 9. Advantageous refinements of the method are described in the claims dependent on claim 9.

An operating fluid container according to the invention made of thermoplastic has two openings which are arranged in mutually opposite container walls of the operating fluid container. Furthermore, the operating fluid container has at least one stiffening element projecting through the two openings. Two stiffening element ends engage behind the container walls here from the outside, and therefore the stiffening element counteracts deformation caused by the internal pressure of the operating fluid container. The operating fluid container according to the invention is distinguished in that a stabilizing element is arranged between at least one stiffening element end and a container wall, wherein the stabilizing element in each case has a passage opening through which the stiffening element projects. Furthermore, the stabilizing element comprises a first and a second thermoplastic, and is welded to a container wall.

Of course, the operating fluid container according to the invention can have a number of stabilizing elements corresponding to the number of stiffening element ends, the stabilizing elements each having a passage opening through which the/a stiffening element projects.

The operating fluid container according to the invention has high pressure stability since the stiffening element, which can be in the form, for example, of a stiffening strut or stiffening tube, counteracts deformation caused by internal pressure. The stabilizing elements arranged between the container walls and the stiffening element ends prevent the container walls from creeping when the operating fluid container according to the invention is pressurized. It is basically known that the thermoplastic HDPE, which customarily forms at least the outer layer of an operating fluid container, becomes plastic again in the event of a persistent pressure loading and has a tendency to creep. The effective supporting surface of the stiffening element on the container wall is increased by means of the stabilizing element, and therefore creeping of the container wall is thereby effectively counteracted. Furthermore, creeping of the container walls is counteracted by the fact that the stabilizing element is designed as a 2-component component, i.e. as a component comprising two thermoplastics. A first thermoplastic of the stabilizing element has the effect that the stabilizing element can be welded to a container wall. Another thermoplastic of the stabilizing element has increased rigidity (e.g. polyamide), and therefore creeping is effectively counteracted. Furthermore, for example, polyamide effectively counteracts diffusion of hydrocarbons, and therefore the operating fluid container according to the invention has reduced permeability to hydrocarbons. Furthermore, the operating fluid container according to the invention can be produced by extrusion and molding of a tubular preform, and therefore the production costs and the production time of the operating fluid container according to the invention are reduced.

The operating fluid container is in the form in particular of a fuel container. The openings in the container walls are preferably arranged opposite one another. The stiffening element ends may also be referred to as stiffening-element connection portions. The stiffening element ends engage behind the openings from the outside, and therefore the stiffening element are also referred to as tie rods.

The stabilizing element may also be referred to as an insert part, insert component, intermediate element, intermediate component or an adapter. The stabilizing element is in the form of a 2-component component, i.e. a component formed from two plastics, in particular two thermoplastics.

Each stabilizing element is therefore arranged in a sandwich-like manner between a stiffening element end and a container wall. Since each stabilizing element is in each case welded to a container wall, the first thermoplastic of the stabilizing elements is welded to the container walls. Consequently, the first thermoplastic is compatible in respect of welding capability with the thermoplastic of the operating fluid container.

The stiffening strut is preferably of tubular configuration.

The stiffening element ends preferably comprise a first and a second thermoplastic and are welded to one stabilizing element each.

The correspondingly formed operating fluid container has a further increase in stability since, in addition to counteracting tensile forces caused by positive pressure, the stiffening element can also, for example, counteract compressive forces caused by negative pressure, between the container walls. Furthermore, the correspondingly formed operating fluid container also has increased torsional rigidity. Furthermore, the operating fluid container formed in such a manner can be produced by means of few method steps, and therefore the production costs for the correspondingly formed operating fluid container are reduced.

The first and second thermoplastics are preferably the same first and second thermoplastics which the stabilizing element also comprises. Of course, the thermoplastics of the stiffening element may also be different thermoplastics than in the stabilizing element. Only compatibility of the plastics in respect of welding capability has to be ensured.

Consequently, the first thermoplastic of the stiffening element ends is welded to the stabilizing elements.

The entire stiffening element preferably comprises the first and the second thermoplastic.

Furthermore preferably, the stabilizing element has an encircling collar which is angled in the direction of a container outer side, and therefore the stabilizing element forms a trough on the container outer side.

By means of a corresponding design of the stabilizing element, a contact surface between the stabilizing element and the container wall is increased, and therefore the stability of the operating fluid container is increased. A corresponding design of the operating fluid container also affords the advantage that the stabilizing element can end flush with the container wall.

The trough is preferably funnel-shaped.

All of the stabilizing elements preferably have a correspondingly formed collar.

The stabilizing element preferably has a wall which surrounds the passage opening therein and forms a receiving space which is open to the container outer side and into which the stiffening element end is received.

In a top view of the stabilizing element, the wall surrounds the passage opening therein.

The wall is preferably of cylindrical design. The cylindrical wall consequently also surrounds the stiffening element end.

Each stabilizing element preferably has a corresponding cylindrical wall.

The operating fluid container preferably has at least one covering which closes the receiving space of the stabilizing element and seals same toward the container outer side.

In the case of a correspondingly formed operating fluid container, the emission path for, for example, hydrocarbons out of the operating fluid container is blocked.

The coverings can be formed, for example, from polyamide (PA) and/or from polyoxymethylene (POM). The coverings are preferably each welded to the cylindrical walls of the stabilizing devices. Since the stabilizing devices are designed as 2-component components, the welding between the covering and the stabilizing device takes place by PA/PA or POM/POM welding.

The operating fluid container is preferably designed in such a manner that the stiffening element is formed in two pieces with a first stiffening element part and a second stiffening element part. In this case, the first stiffening element part projects through a first opening in a first container wall and the second stiffening element part projects through a second opening in a second container wall. The stiffening element end of the first stiffening element part engages behind the first container wall and the stiffening element end of the second stiffening element part engages behind the second container wall, in each case from the outside. Both the first stiffening element part and the second stiffening element part each have, opposite their stiffening element ends, a connecting device, which connecting devices are used to connect the two stiffening element parts to each other.

A correspondingly formed operating fluid container is optimized in respect of its production time. This is because the stiffening element parts are introduced into the operating fluid container from two mutually opposite sides and are connected to each other within the operating fluid container.

A first connecting device is arranged in the stiffening element end of the first stiffening element part, and a second connecting device is arranged in the stiffening element end of the second stiffening element part.

The first connecting device can comprise at least one latching receptacle and the second connecting device can comprise at least one latching tongue.

The first connecting device can comprise at least one latching hook and the second connecting device can comprise at least one latching tooth.

The operating fluid container is preferably designed in such a manner that at the ends opposite the stiffening element ends, the respective stiffening element parts have a cutting device for severing the container wall.

A correspondingly formed operating fluid container can be produced in a further shortened cycle time since the openings in the container walls of the operating fluid container do not have to be made/formed in a separate step, but rather can be formed by inserting the stiffening element parts into the operating fluid container.

The operating fluid container is preferably formed in such a manner that the operating fluid container is produced by blow molding a tubular preform.

The object on which the present invention is based is also achieved by a method for producing an operating fluid container made of thermoplastic with at least one stiffening element which is arranged between mutually opposite container walls and counteracts deformation caused by the internal pressure of the operating fluid container, wherein the method has the following method steps:

providing at least one stabilizing element having a passage opening;

introducing a tubular preform made of thermoplastic into a blow mold having a mold cavity which defines the contour of the operating fluid container;

molding the preform inside the mold cavity, wherein the preform surrounds the stabilizing element on the mold cavity side and is welded to the stabilizing element;

producing two openings in mutually opposite container walls of the operating fluid container;

inserting a first stiffening element part through a first opening and a second stiffening element part through a second opening such that at least one stiffening element end of the stiffening element parts is/are in direct contact with the stabilizing element/the stabilizing elements, wherein the stiffening element ends each engage behind the container walls; and connecting the first stiffening element part to the second stiffening element part by means of connecting devices provided on the stiffening element parts.

The method is preferably designed in such a manner that the openings in the mutually opposite container walls are introduced into the container walls by means of a respective cutting device of the stiffening element parts opposite the stiffening element ends by the first stiffening element part being pushed through a first container wall and the second stiffening element part being pushed through a second container wall.

The correspondingly designed method affords the advantage that fewer method steps are necessary for producing the operating fluid container since the method steps of producing openings in the container walls of the operating fluid container are realized together with the introducing/pushing of a first stiffening element part through a first container wall and of a second stiffening element part through a second container wall.

BRIEF DESCRIPTION OF THE DRAWINGS

Further advantages, details and features of the invention emerge below from the explained exemplary embodiments. In the figures, in detail:

FIGS. 2-4 show various variants of the connection of the stiffening element parts to one another.

DETAILED DESCRIPTION

In the description which now follows, the same reference signs denote the same components or the same features, and therefore a description regarding a component and carried out with reference to a figure also applies to the other figures such that a repetitive description is avoided. Furthermore, individual features which have been described in conjunction with one embodiment are also usable separately in other embodiments.

Figure 1:
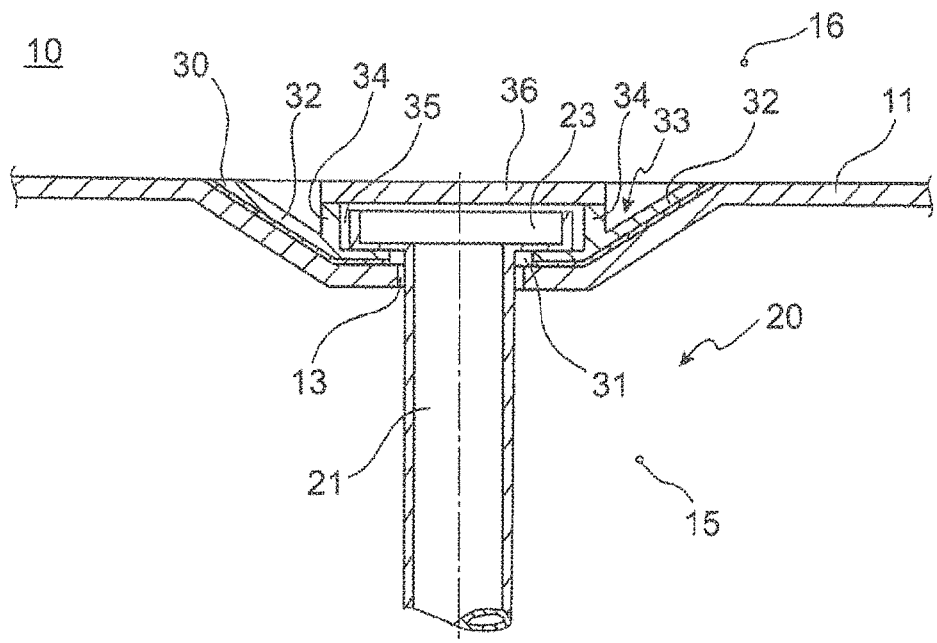
FIG. 1 shows a schematic sectional view of an operating fluid container according to the invention.
Figure 1:
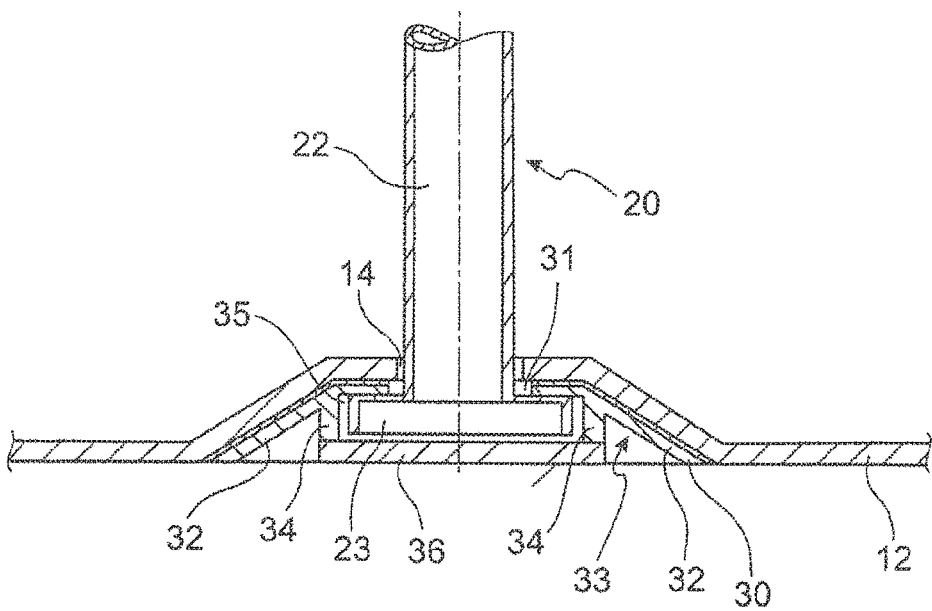

FIG. 1 shows a schematic sectional view of an operating fluid container 10 according to the invention. The operating fluid container 10 is customarily produced from a thermoplastic. In the exemplary embodiment illustrated, the operating fluid container 10 is in the form of a fuel container 10, but the operating fluid container 10 may also be designed for receiving a urea solution or wiping water or oil or the like.

It is apparent from FIG. 1 that a first opening 13 is arranged in a first container wall 11 of the operating fluid container 10. A second opening 14 arranged opposite the first opening 13 is provided in a second container wall 12 of the operating fluid container 10. The operating fluid container 10 furthermore comprises a stiffening element 20 which projects through the two openings 13, 14 and is in the form of a tie rod 20. The stiffening element 20 is formed in two parts and comprises a first stiffening element part 21 and a second stiffening element part 22. The two stiffening element parts 21, 22 are connected to each other. In respect of the manner of connection of the stiffening element parts 21, 22, reference is made further below to the statements regarding FIGS. 2 to 4.

The first stiffening element part 21 projects through the first opening 13, which is arranged in the first container wall 11, and the second stiffening element part 22 projects through the second opening 14, which is arranged in the second container wall 12. One stiffening element end 23 of the first stiffening element part 21 engages behind the container wall 11 from the outside, and one stiffening element end 23' of the second stiffening element part 22 engages behind the second container wall 12 from the outside, and therefore the stiffening element 20 counteracts deformation caused by the internal pressure of the operating fluid container 10.

It is furthermore apparent from FIG. 1 that the operating fluid container 10 in the exemplary embodiment illustrated comprises two stabilizing elements 30. One stabilizing element 30 is arranged between the stiffening element end 23 of the first stiffening element part 21 and the first container wall 11. A further stabilizing element 30 is arranged between the stiffening element end 23' of the second stiffening element part 22 and the second container wall 12.

The stabilizing elements 30 each comprise a first and a second thermoplastic, wherein at least one first thermoplastic is formed compatibly in respect of the welding capability with a thermoplastic of which the container walls 11, 12 are composed. The upper stabilizing element 30 illustrated in FIG. 1 is therefore welded to the first container wall 11, and the stabilizing element 30 illustrated at the bottom in FIG. 1 is welded to the second container wall 12. It is indicated graphically in FIG. 1 for the stabilizing elements 30 that the latter comprise a layer which is composed of the first thermoplastic (for example HDPE) and is in direct contact with the container wall 11, 12, and a layer which is composed of the second thermoplastic (for example polyamide) and is in direct contact with the stiffening element end 23, 23'.

The second thermoplastic of the stabilizing elements can be formed, for example, from PA or POM which have a greater hardness than, for example, HDPE. For this reason, the stabilizing elements 30 will not be thinned out during tensile stressing of the stiffening element 20. Furthermore, thinning out of the first container wall 11 and of the second container wall 12 is counteracted by the fact that the forces which are exerted on the first container wall 11 and the second container wall 12 via the stiffening elements 20 are transmitted over a greater surface, namely the respective contact surfaces between the stabilizing devices 30 and the container walls 11, 12. Therefore, in the case of the operating fluid container 10 according to the invention, both the first container wall 11 and the second container wall 12 have less tendency to creep in the event of pressurization because of the stiffening element 20.

The stiffening element ends 23, 23' of the first stiffening element part 21 and of the second stiffening element part 22 also comprise a first and a second thermoplastic, and therefore the stiffening element ends 23, 23' are also correspondingly welded to the respective stabilizing devices 30. Tensile forces caused by negative pressure in the operating fluid container 10 can therefore also be transmitted to the first container wall 11 and the second container wall 12 by means of the stiffening element 20. Furthermore, torsional forces can be transmitted to the first container wall 11 and the second container wall 12 by means of the stiffening element 20.

It is furthermore apparent from FIG. 1 that each stabilizing element 30 has an encircling collar 32 which is angled in the direction of a container outer side 16 such that the stabilizing elements 30 each form a trough 33 on the container outer side 16. The effect which can be achieved by a corresponding design of the stabilizing elements 30 is that the stabilizing elements 30 end flush with the container walls 11, 12 of the operating fluid container 10 and therefore do not project out of the outer surface of the container walls 11, 12.

Each stabilizing element 30 comprises a wall 34 which surrounds the passage opening 31 therein, through which the stiffening element 20 projects, and which is designed in the exemplary embodiment shown as a cylindrical wall 34. The cylindrical wall 34 forms a receiving space 35 which is open to the container outer side 16. The stiffening element end 23 of the first stiffening element part 21 is received into the receiving space 35 of the stabilizing element 30 illustrated at the top in FIG. 1. The stiffening element end 23' of the second stiffening element part 22 is received in the receiving space 35 of the stabilizing element 30 illustrated at the bottom in FIG. 1.

The receiving spaces 35 of the stabilizing elements 30 are each closed by means of a covering 36 and sealed toward the container outer side 16. The coverings 36 are preferably welded to the end sides of the cylindrical walls 34 of the corresponding stabilizing elements 30. By means of a corresponding design, the diffusion of, for example, hydrocarbons out of the container inner side 15 toward the container outer side 16 is reduced.

It is illustrated by way of indication in FIGS. 2 to 4 that the stiffening element parts 21, 22 can be latched to each other in their penetration region in various ways. Alternatively, said stiffening element parts can also be connected to each other via a rotary latching connection (quarter-turn closure), screw connection or a bayonet-type connection.

FIG. 2 shows a schematic view of a latching connection comprising a latching receptacle 24 and a latching tongue 26 adapted with respect thereto. For example, a plurality of latching receptacles 24 can be provided on the outer side of a cylindrical portion of the first stiffening element part 21, said latching receptacles being arranged at a distance from one another, being in the form of latching channels and in which latching tongues 26 fastened circumferentially to the insert engage. For this purpose, the latching tongues 26 can be provided with latching springs 27 which spring into correspondingly designed latching recesses 25 of the latching receptacles 24, as is illustrated in FIG. 2A. FIG. 2A shows a longitudinal section through the latching.

FIG. 3 shows an alternative variant of a latching connection of the first stiffening element part 21 to the second stiffening element part 22. It is provided here that the cylindrical portion of the first stiffening element part 21 is in each case latched over the entire circumference to the cylindrical portion of the second stiffening element part 22, wherein latching teeth 28 are provided encircling on the inside of the cylindrical portion of the first stiffening element part 21, and a latching hook 29 formed peripherally is provided on the outer circumference of the cylindrical portion of the second stiffening element part 22. It is clear to a person skilled in the art that, instead of peripheral latching teeth 28, latching means arranged distributed discretely on the circumference of the cylindrical portions of the first stiffening element part 21 and of the second stiffening element part 22 can also be provided.

Finally, FIG. 4 illustrates in highly simplified form a type of quarter-turn closure, via which the cylindrical portions of the first stiffening element part 21 and of the second stiffening element part 22 can be locked to each other in a form-fitting manner.

LIST OF REFERENCE SIGNS 10 operating fluid container/fuel container
11 first container wall (of the operating fluid container)
12 second container wall (of the operating fluid container)
13 first opening (of the operating fluid container)
14 second opening (of the operating fluid container)
15 container inner side
16 container outer side
20 stiffening element
21 first stiffening element part
22 second stiffening element part
23, 23' stiffening element end/connecting portion of the stiffening element
24 connecting device/latching receptacle
25 connecting device/latching recess
26 connecting device/latching tongue
27 connecting device/latching spring
28 connecting device/latching teeth
29 connecting device/latching hook
30 stabilizing element
31 passage opening/pass-through opening (of the stabilizing element)
32 collar (of the stabilizing element)
33 trough (of the stabilizing element)
34 cylindrical wall (of the stabilizing element)
35 receiving space (of the stabilizing element)
36 covering

What is claimed is:

1. An operating fluid container made of thermoplastic for a motor vehicle, comprising:
   the operating fluid container has two openings in mutually opposite container walls of the operating fluid container, and a stiffening element projecting through the two openings; and
   two stiffening element ends engage behind the container walls from outside, such that the stiffening element counteracts deformation caused by internal pressure of the operating fluid container,
   at least one stabilizing element, the at least one stabilizing element arranged between one of the stiffening element ends and one of the container walls;
   the at least one stabilizing element has a passage opening through which the stiffening element projects;
   the at least one stabilizing element comprises a first and a second thermoplastic; and
   the at least one stabilizing element is welded to one of the container walls.

2. The operating fluid container as claimed in claim 1, wherein the at least one stabilizing element comprises two stabilizing elements, each of the two stabilizing elements arranged between one of the stiffening element ends and one of the container walls, respectively, and
   the stiffening element ends each comprise a first and a second thermoplastic and are welded to one of the stabilizing elements, respectively.

3. The operating fluid container as claimed in claim 1, wherein the at least one stabilizing element has an encircling collar which is angled in a direction of a container outer side, such that the stabilizing element forms a trough on the container outer side.

4. The operating fluid container as claimed in claim 1, wherein the at least one stabilizing element has a wall which surrounds the passage opening therein and forms a receiving space which is open to a container outer side and into which one of the stiffening element ends is received.

5. The operating fluid container as claimed in claim 4, wherein the operating fluid container has at least one covering which closes the receiving space of the stabilizing element and seals same toward the container outer side.

6. The operating fluid container as claimed in claim 1, wherein:
   the stiffening element is formed in two pieces with a first stiffening element part and a second stiffening element part;
   the first stiffening element part projects through a first opening of the two openings in a first container wall of the container walls and the second stiffening element part projects through a second opening of the two openings in a second container wall of the container walls;
   one of the stiffening element ends is of the first stiffening element part and engages behind the first container wall and one of the stiffening element ends is of the second stiffening element part and engages behind the second container wall, in each case from outside; and
   the first stiffening element part and the second stiffening element part each has a connecting device, which connecting devices are used to connect the two stiffening element parts to each other.

7. The operating fluid container as claimed in claim 6, wherein the first stiffening element part and the second stiffening element part each has a cutting device for severing one of the container walls, respectively.

8. The operating fluid container as claimed in claim 1, wherein the operating fluid container is a blow molded container.

9. A method for producing an operating fluid container made of thermoplastic with at least one stiffening element which is arranged between mutually opposite container walls and counteracts deformation caused by the internal pressure of the operating fluid container, having the following method steps:
   providing at least one stabilizing element having a passage opening;
   introducing a tubular preform made of thermoplastic into a blow mold having a mold cavity which defines the contour of the operating fluid container;
   molding the preform inside the mold cavity, wherein the preform surrounds the stabilizing element on the mold cavity side and is welded to the stabilizing element;
   producing two openings in mutually opposite container walls of the operating fluid container;
   inserting a first stiffening element part through a first opening and a second stiffening element part through a second opening such that at least one stiffening element end of the stiffening element parts is/are in direct contact with the stabilizing element/the stabilizing elements, wherein the stiffening element ends each engage behind the container walls; and
   connecting the first stiffening element part to the second stiffening element part by connecting devices provided on the stiffening element parts.

10. The method as claimed in claim 9, wherein the openings in the mutually opposite container walls are introduced into the container walls by a respective cutting device of the stiffening element parts opposite the stiffening element ends by the first stiffening element part being pushed through a first container wall and the second stiffening element part being pushed through a second container wall.

11. The method as claimed in claim 9, wherein the stiffening element ends comprise a first and second thermoplastic and are welded to one stabilizing element each.

* * * * *